United States Patent [19]

Bauer et al.

[11] Patent Number: 5,116,026
[45] Date of Patent: May 26, 1992

[54] MODULAR ANNEALING APPARATUS FOR IN SITU REACTOR VESSEL ANNEALING AND RELATED METHOD OF ASSEMBLY

[75] Inventors: Frank I. Bauer, Perry; Robert S. Mavretish, New Stanton, both of Pa.

[73] Assignee: Westinghouse Electric Corp., Pittsburgh, Pa.

[21] Appl. No.: 368,454

[22] Filed: Jun. 19, 1989

[51] Int. Cl.$^5$ ............................................. C21B 13/00
[52] U.S. Cl. ..................................... 266/44; 266/249; 148/516
[58] Field of Search ............... 266/44, 87, 249; 148/1, 148/4, 13

[56] References Cited

U.S. PATENT DOCUMENTS

| | | |
|---|---|---|
| 3,716,450 | 2/1973 | Lions ................................ 176/19 R |
| 3,809,608 | 5/1974 | Katz et al. ............................ 176/87 |
| 4,305,286 | 12/1981 | Beuth et al. ........................ 73/343 B |
| 4,394,562 | 7/1983 | Epstein et al. ........................ 219/306 |
| 4,602,767 | 7/1986 | Spiegelman et al. ................. 266/87 |
| 4,659,898 | 4/1987 | Spiegelman et al. ............. 219/117.1 |
| 4,708,324 | 11/1987 | Spiegelman et al. ................. 266/87 |

OTHER PUBLICATIONS

"In Place Thermal Annealing of Nuclear Reactor Pressure Vessels" NUREG/CR 42/2, EGG-125-6708, Apr. 1985.

Chromalox Brochure, undated Letter dated 2/19/88, Miselis to Del George re Soviet Lecture.

*Primary Examiner*—Scott Kastler
*Attorney, Agent, or Firm*—Z. L. Dermer

[57] ABSTRACT

An annealing apparatus is described which is designed, manufactured, preassembled and tested at a factory in equal-sized, longitudinal, self-contained segments. In a typical arrangement each segment is one-quarter of the total unit. Each segment includes a support frame, an arcuate heater shell covered with a plurality of heaters and thermocouples, heater and thermocouple connectors, a segmented upper flange, a utility flange and connectors for attaching adjacent segments. Each segment is transported to the nuclear reactor, fit through the equipment hatch of the containment building and assembled in the reactor vessel with the remaining segments using a crane in the building. Appropriate connections for the individual heaters and thermocouples of each segment are made by personnel introduced into the building and are led out the top of the annealing apparatus to a control station. The methods include the steps of: prefabricating and pretesting the segments at a factory; transporting a plurality of the segments to the reactor, introducing each segment through the containment building hatch; assembling the plurality of segments at the reactor vessel into an annealing apparatus; annealing; disassembling the apparatus; and removing the segments from the containment building.

14 Claims, 5 Drawing Sheets

MODULAR ANNEALING APPARATUS FOR IN SITU REACTOR VESSEL ANNEALING AND RELATED METHOD OF ASSEMBLY

CROSS REFERENCES TO RELATED APPLICATIONS

This application and the following co-assigned, co-pending U.S. patent applications relate to reactor vessel annealing: U.S. Patent Application Ser. Nos. 368,443 entitled "Water Filled Tanks For Temporary Shielding of Reactor Vessel Internals And Method of Assembly," Grimm and Sejvar; 368,635 entitled "Coffer Dam For Temporary Shielding Of Reactor Vessel Internals and Method of Assembly," Bauer et al.; and 368,503, entitled "Annealing Unit Insertion and Removal System," Reiner and Kordaliski all filed on June 19, 1989.

BACKGROUND OF THE INVENTION

This invention relates to nuclear reactor vessel annealing and, more particularly, to a modular or multicomponent apparatus for in situ annealing of the vessel and related methods for introducing the components of the apparatus into the containment building, assembling and removing same.

DESCRIPTION OF THE PRIOR ART

As a result of constant bombardment by neutron radiation during a nuclear reactor's operation over time, the metal in certain sections of a nuclear reactor vessel tends to lose its ductility and becomes brittle. Brittleness may lead to cracks forming in the nuclear reactor vessel, particularly when cold water must be introduced into the vessel cooling system as a result of a malfunction in the system.

It is known that annealing can restore the ductility of the metal so that the useful life of the reactor can be safely prolonged. Annealing is a process of heating and cooling a substance such as steel to make the steel less brittle. In order to avoid the creation of additional stresses, a major portion of the reactor vessel must be annealed.

To perform annealing, the nuclear reactor is shut down, the reactor vessel is opened, the fuel is stored in a fuel storage pit and the reactor upper and lower internals are stored in respective refueling canal positions. Then, an annealing apparatus must be introduced into the vessel.

Major obstacles exist when attempting to anneal large commercial reactor vessels housed in containment buildings. An annealing apparatus fabricated in a factory and intended for use in a large commercial reactor vessel would be very difficult to transport because the size of a container suitable for truck or train transport is limited. Further, since the equipment hatch of a commercial reactor containment building is necessarily restricted in size, the annealing apparatus could not fit through the hatch.

Suggested solutions for overcoming these obstacles might include introduction of the annealing apparatus into the containment building before completion of the construction of the reactor, assembling the annealing apparatus piece-by-piece in the containment building instead of in the factory, or enlarging the equipment hatch to accept the factory assembled annealing apparatus. These potential solutions are un-realistic because of excessive cost, space and time requirements and/or the need for major modifications to the containment building.

More particularly, if the annealing apparatus were introduced during construction or assembled piece-by-piece in the building, when needed, it would probably be retained at the specific reactor where it was assembled, thereby rendering it non-reusable at other reactors and resulting in an expensive, perhaps one-time use piece of equipment. The apparatus would also pose space requirement problems in reactor design. Further, it is, of course, detrimental to introduce personnel into the containment building for the long periods of time necessary to assemble an apparatus piece-by-piece. Finally, there is a strong desire to keep the containment building as intact as possible. Any modification to the containment building would require rigorous requalification and verification of the containment's integrity, which is a very costly and time-consuming activity and would, most likely, require U.S. Nuclear Regulatory Commission approval.

Accordingly, a need exists for an improved apparatus for in situ annealing of reactor vessels which can be easily and economically introduced into the containment building, assembled, disassembled, removed and reused.

SUMMARY OF THE INVENTION

Accordingly, it is a purpose of the present invention to provide an annealing apparatus which can be fabricated in separate, self-contained, proportional components, tested in a factory, and, according to related methods, easily transported to a nuclear reactor, introduced into the hatch of the containment building and assembled at the reactor vessel.

It is another purpose of the present invention to provide an annealing apparatus which can be easily disassembled and removed from the containment building, and a related method for disassembly and removal.

It is another purpose of the present invention to provide an annealing apparatus which can be economically reused at a plurality of reactors.

It is another purpose of the present invention to provide methods of introducing and assembling an annealing apparatus requiring as little human presence in the containment building as possible.

To achieve the foregoing and other purposes of the present invention, there is provided an annealing apparatus designed, manufactured, preassembled and tested at a factory in equal-sized, longitudinal, self-contained segments. In a typical arrangement each segment is one-quarter of the total unit. Each segment includes a support frame, an arcuate heater shell covered with a plurality of heaters and thermocouples, heater and thermocouple connectors, a segmented upper flange, a utility flange and connectors for attaching one segment to adjacent segments.

Each segment is transported to the nuclear reactor by truck and/or train, fit through the equipment hatch of the containment building and assembled at the reactor vessel with the remaining segments into the annealing apparatus using a crane already in the containment building. The assembly can occur at a separate assembly and test stand, whereupon the unit is assembled, tested, removed from the stand and inserted into the reactor vessel, or the segments can be assembled into the annealing apparatus directly in the reactor vessel. Appropriate connections for the individual heaters and thermocouples of each segment are led out the top of the heater unit assembly to a control station.

The method according to the invention includes the steps of: prefabricating and pretesting the segments at a factory; transporting a plurality of the segments to the reactor; introducing each segment through the equipment hatch; assembling the plurality of segments at the reactor vessel into an annealing apparatus; annealing; disassembling the apparatus; and removing the segments from the containment building.

Other features and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present invention will now be described in detail with reference to FIGS. 1-11.

In these figures there is shown what is known as a typical Westinghouse 3-loop pressurized water reactor (PWR) nuclear power plant. The actual arrangements of nuclear power plants, however, vary by the specific plant. Also, 2-loop and 4-loop PWR plants have similar but different arrangements as known in the art. The present invention can be readily adapted by those of ordinary skill in this field to all these different plant arrangements, number of loops, plus non-Westinghouse PWR plant designs.

Figure 1:
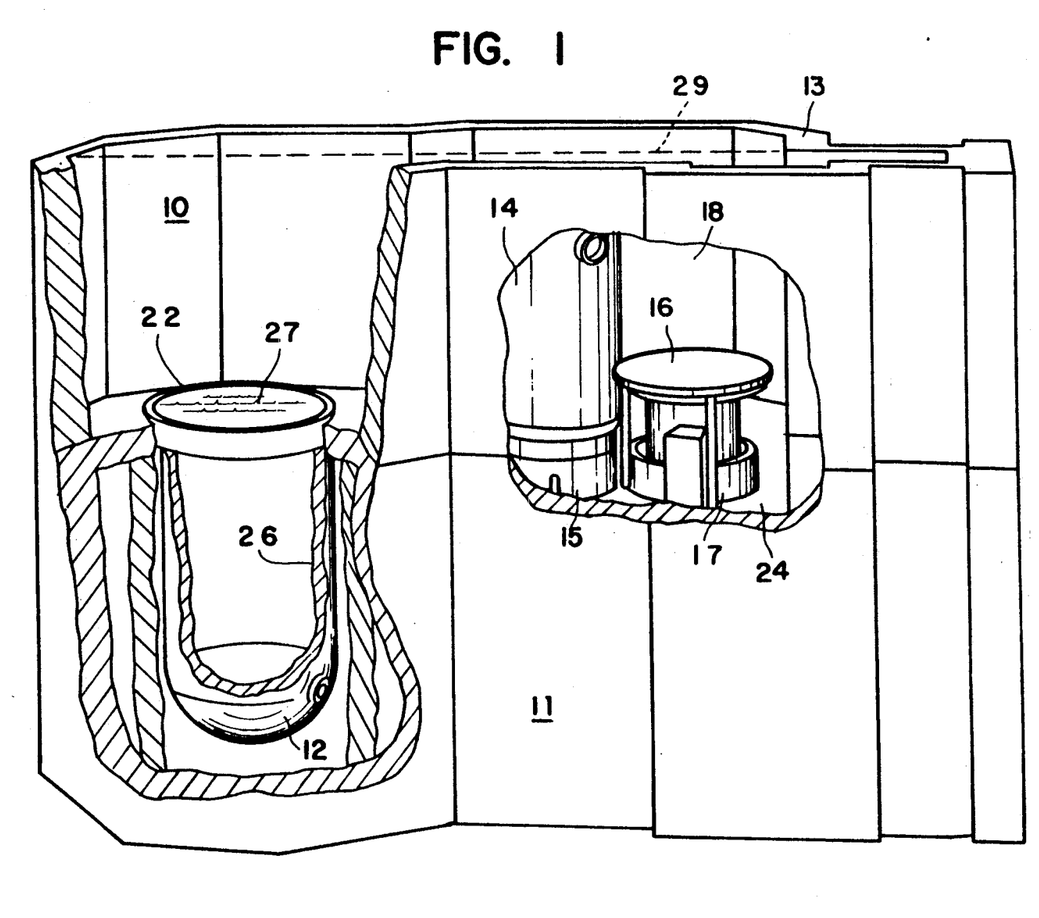
FIG. 1 is a perspective view of the containment building with the reactor vessel therein, and the upper and lower internals removed and stored in the refueling canal.
Figure 5:
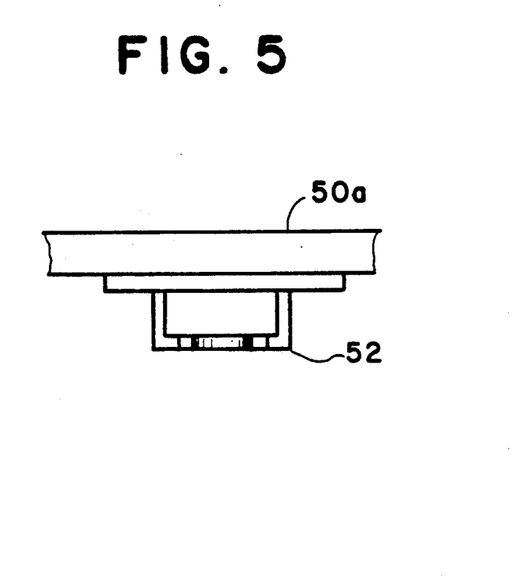
FIG. 5 is a top view of a female member of a bayonet slide used to couple adjacent segments.

FIG. 1 is a perspective view of a containment building 10 with a cutaway in the front left of a forward concrete wall 11 to show a reactor vessel 12 therein. The reactor vessel 12 is an elongated, generally cylindrically shaped member of a known design for use in a nuclear reactor system. The reactor vessel 12 has a hemispherical bottom and inlet and outlet primary system water nozzles 20 (FIG. 5).

In FIG. 1, the reactor vessel closure head (not shown) has already been removed and the radioactive lower and upper internals, 14 and 16, respectively, have been removed and stored. The front right portion of the wall 11 is also cut away to show the internals 14, 16 in their respective storage racks, 15, 17, in a refueling canal 18. The refueling canal 18 is located above the vessel 12, with an upper flange 22 of the vessel 12 being generally co-planar with a bottom 24 of the refueling canal 18.

The vessel 12 as shown in FIG. 1 is under a refueling condition and is ready for in-situ annealing. At this time, the refueling water is at a maximum level 27 within the vessel 12.

Before introducing a annealing apparatus into the containment building 10, precautions must be taken to prevent radiation emitted by the stored internals 14, 16 from being introduced into the area at which the annealing apparatus will be assembled with human assistance. In this regard, temporary radiation shielding of the stored internals can be used according to the methods described in Assignee's above-referenced U.S. patent applications entitled "Water Filled Tanks For Temporary Shielding of Reactor Vessel Internals And Method of Assembly," and "Coffer Dam For Temporary Shielding Of Reactor Vessel Internals and Method of Assembly."

In either case, the refueling canal 18 is flooded to put the lower and upper internals, 14, 16, under water to provide radiation shielding. The water level 29 in the refueling canal 18 is just below the containment building operating floor 13. Then, according to the former above-referenced method pluralities of vertical and horizontal tanks (not shown) are interposed between the stored internals 14, 16 and the reactor vessel 12 and water is drained from the refueling canal 18 to the level 27 at about the reactor vessel flange 22. In the latter method, a multi-part coffer dam (not shown) is assembled on the reactor vessel flange 22 and the water therein is pumped out.

The next step in the annealing process is to introduce the annealing apparatus into the reactor vessel 12 and pump the remaining water from the reactor vessel 12. The components and assembly of the annealing apparatus according to the present invention will now be described with reference to FIGS. 2-11.

The annealing apparatus is designated by the reference numeral 28 (FIGS. 9 and 10) and generally includes a plurality of separate heater segments 30 which are introduced into the containment building 10 and assembled at the reactor vessel 12 for an annealing operation.

Figure 2:
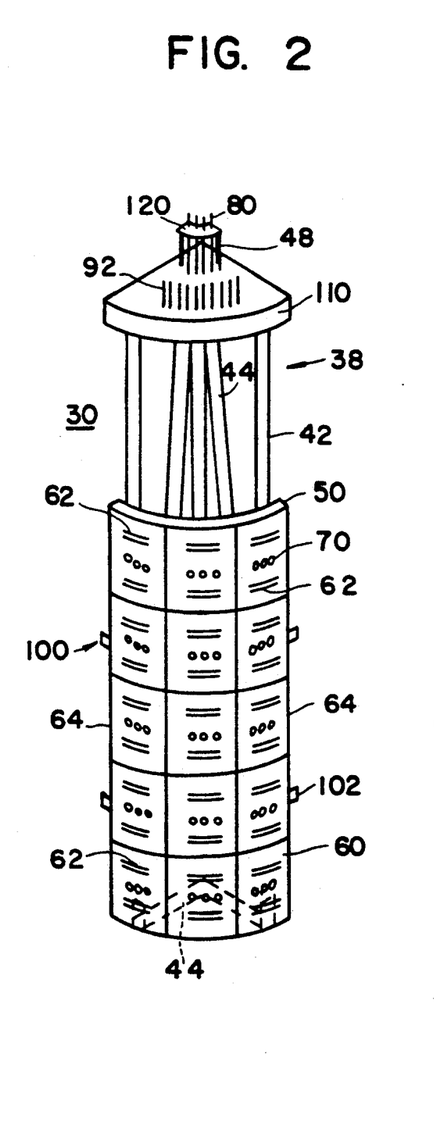
FIG. 2 is a perspective view of a segment of the annealing apparatus according to the present invention.
Figure 3:
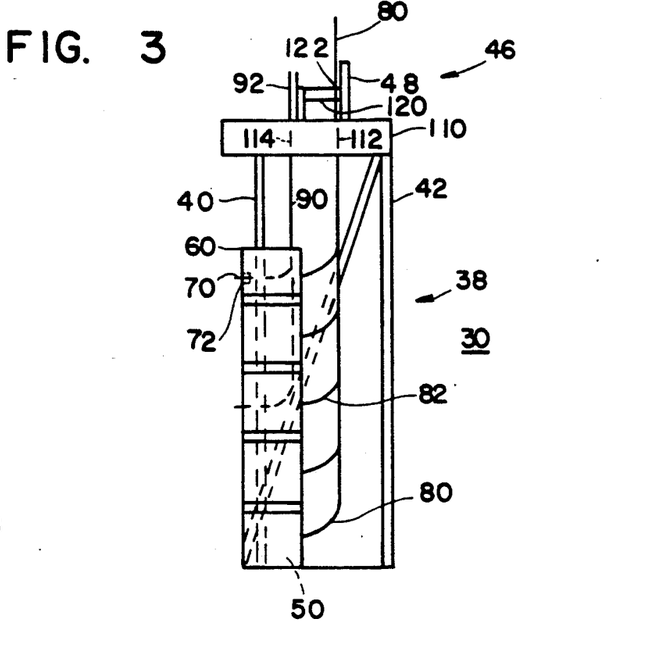
FIG. 3 is a side view of the segment shown in FIG. 2.

FIGS. 2 and 3 are perspective and side views, respectively, of one pre-assembled segment 30 according to the present invention. Although only one segment is shown, a plurality of virtually identical segments 30 are assembled at the reactor vessel 12 into the annealing apparatus 28 as described below.

In a typical arrangement each segment 30 is one-quarter of the total cylindrical annealing apparatus 28. However, the choice of segment size and quantity can be varied as required to satisfy manufacturing, transport and plant specific conditions, such as equipment hatch 34 (FIG. 8) and reactor vessel 12 size.

Each segment 30 generally includes a support frame 38, a heater shell 50 including heaters 60 and thermocouples 70, heater connectors 80, thermocouple connectors 90, segment connecting means 100, a segmented upper flange 110 and a utility flange 120.

Support frame 38 includes both a lower, primary support frame 40 and an upper, secondary support frame 46, each of which is preferably made of steel.

The primary support frame 40 includes a set of longitudinal members 42, usually three, joined by a plurality of cross members 44. The members 42, 44 form a segment of a cylinder to support the heater shell 50 and allow connection and support of adjacent segments 30. The segmented upper flange 110 discussed below is attached to the top of the primary support frame 40.

The secondary support frame 46 includes a plurality of upright members 48 extending between a segmented upper flange 110 and a utility flange 120

The heater shell 50 is an arcuate member whose arc corresponds in degrees to the corresponding fraction of the overall annealing apparatus 28 represented by a segment 30. For example, if four segments 30 are used, each segment 30 and each heater shell 50 has a 90 degree arc; if three segments, 120 degrees, and so on.

Attached to the heater shell 50 is the plurality of heaters 60. Each heater 60 is a rectangular member which is also arced to conform to the shape of the heater shell 50.

As in Assignee's U.S. Pat. No. 4,602,767 (hereinafter the '767 patent), each heater 60 includes heater elements 62 which are double strands of spiral nickel-chromium heater wire threaded through ceramic beads. Either wire of the double strand in each heater element 62 is capable of providing the required heat density, with the second wire being redundant to assure even heating should the first wire fail.

FIG. 2 shows schematically pairs of heater elements 62 above and below a cluster of thermocouples 70. However, as known in the art, many heater element 62 pairs are included in each heater 60. The heater elements 62 are arranged on the heater 60 in an array which generates a substantially uniform radiation pattern.

Each heater 60 should be placed very close to adjacent heaters 60 to ensure that substantially all of the heater shell 50 surface is capable of generating heat to effect a broad and continuous heat source for annealing.

The heaters 60 can be arranged in a grid of parallel vertical and horizontal rows where all edges coincide, or, e.g. in a staggered array, wherein a vertical edge of one heater 60 is located at the midpoint of the upper edge of a lower heater 60. In the former case, the vertical edges of the heaters 60 in end vertical rows co-terminate with the seams 64 of adjacent segments 30. In the latter case, it is not preferred to use partial heaters 60 at the seams 64. As a result, heaters 60 can be applied across the seams 64 while the annealing apparatus 28 is being assembled on the assembly and test stand 132 described below.

The outer circumference of the completed annealing apparatus 28 closely resembles the inner circumference of the reactor vessel 12 so that the heaters 60 will be positioned close to an internal wall 26 of the reactor vessel 12 when the annealing apparatus 28 is located in the reactor vessel 12.

The heater elements 62 receive connectors 80, which are power cables 82. There are two sets of power cables 82, one for each of the primary and secondary wires of the heater elements 62. The power cables 82 extend from the heater elements 62, through the primary support frame 40, through ports 112 in the segmented upper flange 110, through the secondary frame 46 and ports 122 in the utility flange 120, whereupon the power cables 82 are directed to a control station (not shown) for carrying out the annealing operation.

The connectors 80, as well as the connectors 90 discussed below are deleted from FIG. 2 between the shell 50 and the segmented upper flange 110 to show the members 42, 44 clearly.

It is very important, when annealing a reactor vessel 12, that the annealing temperature be accurately controlled which in turn requires that the vessel 12 temperature be accurately measured. The temperature measurements are taken by the thermocouples 70 which are supported by actuators 72 mounted in bores 74 in the heaters 60. Many types of known thermocouples can be used. A preferred type is a manually actuatable thermocouple. Another type is described in the above-cited '767 patent, i.e. a pressurized fluid actuated thermocouple. One drawback of the pressurized fluid type is that fluid leaks can occur in the thermocouples which are detrimental to the dry annealing operation.

The thermocouples 70 are arranged within the matrix of heaters 60, usually in clusters of threes, so as to project between adjacent heater elements 62 and be able to measure contact temperature of the wall 26 and the air temperature adjacent to the wall 26. Since the thermocouples 70 are susceptible to damage when the annealing apparatus 28 is installed, they are designed to be retractable during installation with their activation being initiated remotely, e.g., from the top of the annealing apparatus 28 by personnel introduced into the containment building 10, through a thermocouple guide tube 92.

The periphery of the heater shell 50 also includes a plurality of connecting means 100, which are used to connect one segment 30 to an adjacent segment 30.

If the segments 30 are to be assembled together in the assembly and test stand 132 before the annealing apparatus 28 is lowered into the reactor vessel 12 as described below, the connecting means 100 might include straps 102 which are attached by nuts and bolts by workmen during assembly.

Figure 4:
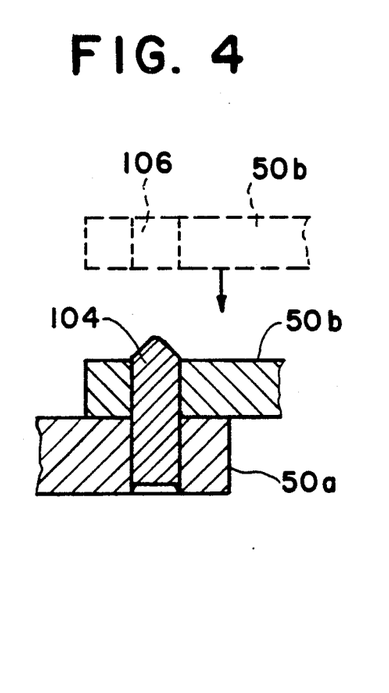
FIG. 4 is a top view of pins used to align adjacent segments during assembly of the annealing apparatus.

It is preferred that alignment locating pins 104 be incorporated in each segment 30 to facilitate alignment of adjacent segments 30 during assembly. More particularly, as shown in FIG. 4, a pin 104 can be formed on one heater shell 50a and a corresponding opening 106 can be formed on an adjacent heater shell 50b. The outer edges of the heater shells 50a and 50b overlap and, when one heater shell 50b is moved toward the adjacent heater shell 50a, the pin 104 is received by the opening 106 to align adjacent segments 30. Of course, a plurality of pins 104 and openings 106 can be used on adjacent segments 30 as desired.

If, however, the annealing apparatus 28 is assembled directly in the reactor vessel 12 as described below, it is preferred that a self-fastening connecting means be used, e.g., a bayonet slide 56.

Figure 6:
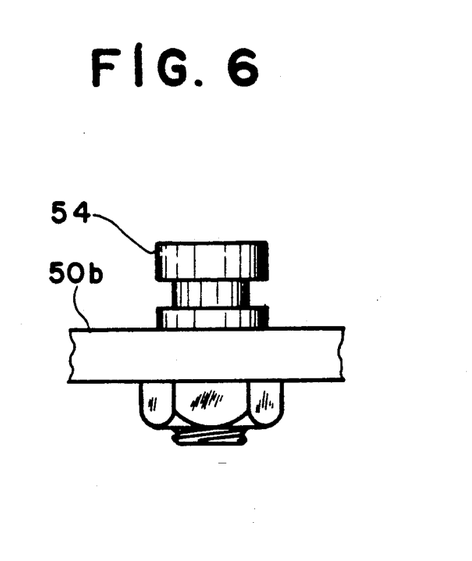
FIG. 6 is a top view of a male member of the bayonet slide.
Figure 7:
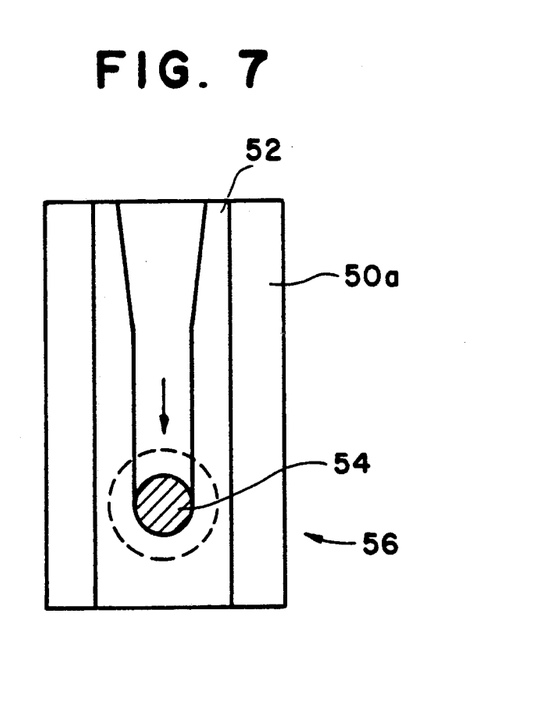
FIG. 7 is a side view of the bayonet slide with a cross-section of the male member.

More particularly, as shown in FIG. 5, a female member 52 is either formed integrally of the heater shell 50a or is attached thereto. As shown in FIG. 6, a pin or male member 54 is attached to an adjacent heater shell 50b. The outer edges of the adjacent shells 50a, 50b overlap and, as shown in FIG. 7, one shell 50a is lowered relative to the adjacent shell 50b to cause the male member 54 to be received by the female member 52 to connect the two segments 50a, 50b. In FIG. 7, the male member 54 is cross sectioned and the heater shell 50b is not shown for clarity.

Figure 10:
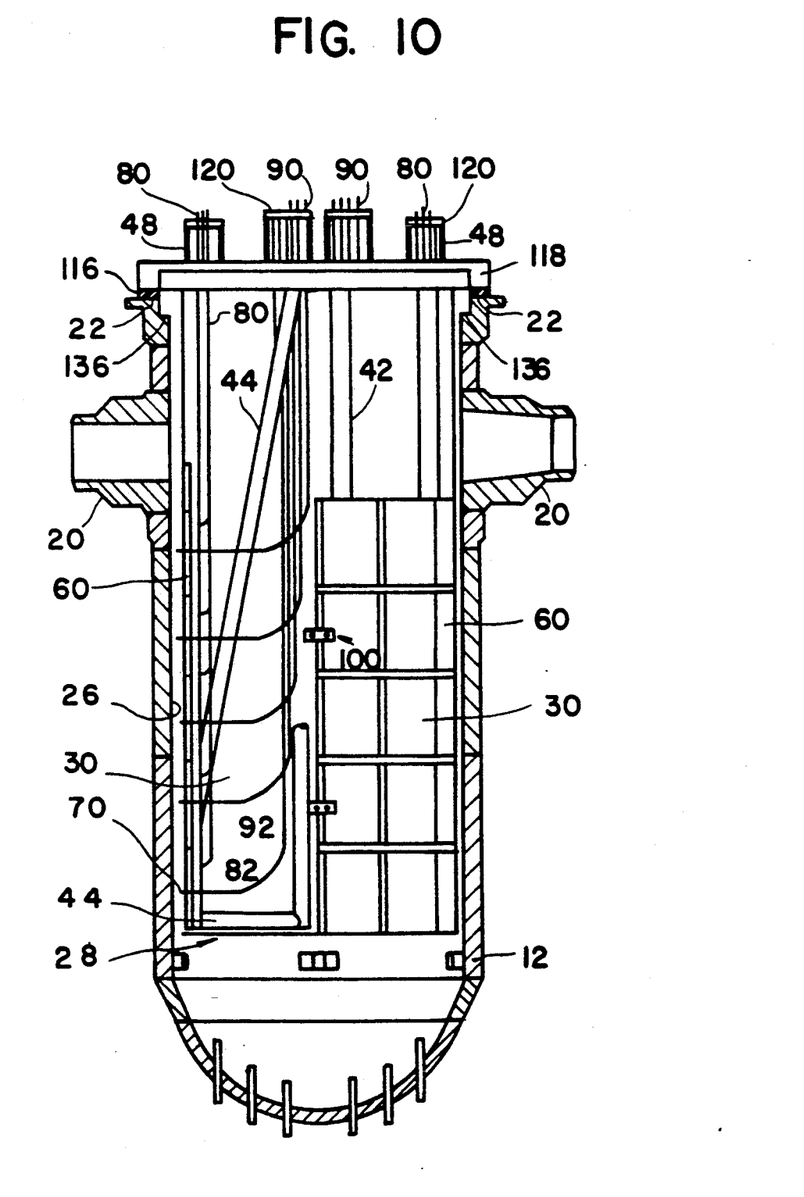
FIG. 10 is a front view illustrating the annealing apparatus installed in the reactor vessel.

Referring to FIGS. 2, 3 and 10 the segmented upper flange 110 is proportionately arced to the segments 30 and, in combination with the other segmented upper flanges 110 forms an upper flange 118. In the alternative, a unitary upper flange 118 may be used, if desired. In either case, the diameter of the upper flange 118 should be about the same as the diameter of the reactor vessel flange 22 and the upper flange 118 is intended to mate and seal with the reactor vessel flange 22, except when the coffer dam temporary shielding discussed above is used, which is described more fully below. Each segmented upper flange 110 includes ports 112, 114, respectively for passing the connectors 80, 90, between each heater 60/thermocouple 70 and each corresponding utility flange 120.

The upper flange 118 includes a sealing means 116 such as an O-ring gasket on the underside thereof which serves to seal the flange 118 to the vessel upper flange 22.

The flange 118 also serves as a radiation shield to prevent radiation emanating from the reactor vessel 12 from entering the area above the annealing apparatus 28 where workman will be present during assembly.

Each segmented utility flange 120 is smaller than the segmented upper flange 110, and includes the ports 122 for receiving the connectors 80.

The methods of introducing the annealing apparatus 28 into the containment building and assembling and removing same according to the present invention will now be described with particular reference to FIGS. 8-11. In one embodiment described below, the segments 30 are assembled in an assembly and test stand 132 inside the containment building 10, but outside of the reactor vessel 12. In a second embodiment, the segments 30 are assembled directly in the reactor vessel 12.

In either embodiment each segment 30 is first preassembled and tested at a factory and shipped in a strong back, reusable, shipping frame 130 to the rector site. The size and weight of each segment 30 makes it readily suitable for truck and/or train transport.

Figure 8:
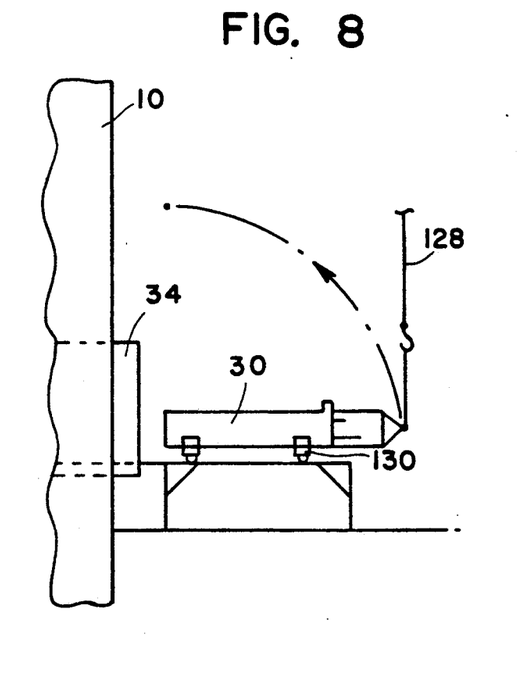
FIG. 8 is a schematic view illustrating introduction of one segment through the containment hatch and up-righting of the segment using a containment crane.

As shown in FIG. 8, at the site the shipping frame 130 and the segment 30 are transferred to the interior of the containment building 10 through the equipment hatch 34. Once inside the containment building 10, the segment 30 is released from the shipping frame 130 and upended using a crane 128 already in the containment building 10.

The shipping frame 130 should include upending features such as pivot pins and internal rails or a roller to permit upending vertically under the natural crane hook positions without loss of control or undue loading of the segment 30 or the shipping frame 130.

Figure 9:
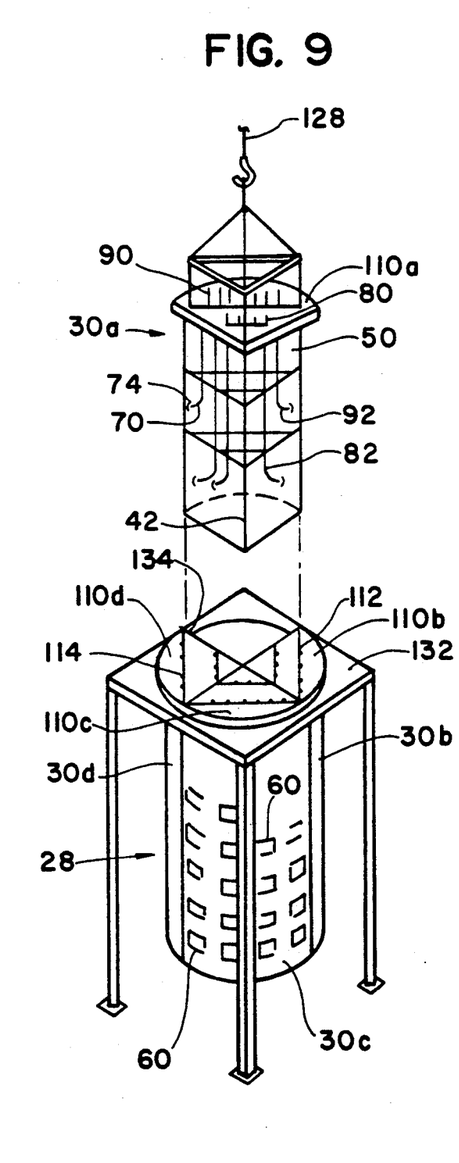
FIG. 9 is a schematic view illustrating insertion of a segment into an assembly and test stand adjacent earlier inserted segments.

FIG. 9 is a schematic view illustrating the insertion of a segment 30a into the assembly and test stand 132 adjacent three earlier inserted segments 30b–d. The four segments 30 a–d, once connected, make up the annealing apparatus 28.

The assembly and test stand 132 is also designed and assembled in segments so as to be easily transported, introduced into the equipment hatch 34, quickly assembled, disassembled, removed and reused.

Men are then introduced into the containment building 10 to connect the connecting means 100, if necessary. Once all segments 30 are connected, the operation of the thermocouples 70 and heaters 60 is tested.

The assembled and tested annealing apparatus 28 is then lifted out of the assembly and test stand 132 as a unit by the crane 128 and placed in the empty reactor vessel 12 for the annealing operation.

Unmanned insertion and removal of an annealing apparatus relative to a reactor vessel can be accomplished according to the method described in Assignee's above-referenced U.S. patent application entitled "Annealing Unit Insertion and Removal System."

FIG. 10 is a front view illustrating the annealing apparatus 28 in the reactor vessel 12 (with one segment not shown for clarity).

In contrast to the above-described method, each segment 30 can be placed directly into the vessel 12 by the crane 128 after being brought in through the equipment hatch 34. This method requires the above-described bayonet slide 56 as a connecting means 100 for vertical remote locking of the segments 30. Testing of the assembled annealing apparatus 28 can occur directly in the reactor vessel 12.

The advantages of assembling the segments 30 together directly in the reactor vessel 12 include the elimination of the assembly and test stand 132, the steps of introducing, assembling and removing same and the space required in the containment building 10 for its use.

Figure 11:
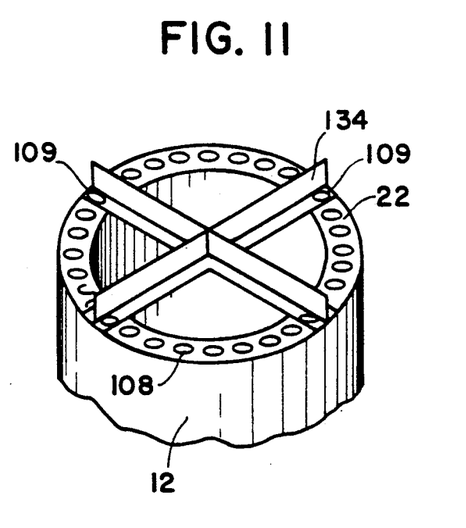
FIG. 11 is a perspective view of a support structure for the annealing apparatus.

A support structure 134 such as shown in FIG. 11 can be used to connect the four segments 30. The support structure 134 can be used when the segments 30 are being assembled together on the assembly and test stand 132 or when the segments 30 are assembled together directly in the reactor vessel 12.

The support structure 134 is put in place on the stand 132 or reactor vessel flange 22 via bolts 109 before the segments 30 are assembled. The support structure 134 could also be used as an adaptor where an annealing apparatus 28 does not fit exactly to the reactor vessel upper flange 22. The support structure 134 is best suited for use with segments 30, each having a segmented upper flange 110 and being assembled in the stand 132, to give support to the flanges 110 and the segments 30 in general. For example, if each segmented upper flange 110 includes holes at the periphery thereof to receive bolts to connect to the holes 108 already formed in the reactor vessel upper flange 22, such a support structure 134 may not be needed. In order for the segmented upper flange 110 of each segment 30 to mate with the support structure 134, the underside of each segmented upper flange 110 should be notched or indented If desired, cap screws not shown) can be used to fasten the notched portion of each segmented upper flange 110 to the support structure 134.

As noted above, a coffer dam can be used to temporarily shield the radiation of the stored internals 14, 16 from the area above the reactor vessel 12. If a coffer dam is used according to the above-referenced, copending application, some modification is required. That is, the coffer dam described therein uses the reactor vessel upper flange 22 as a seating surface. As a result, the segmented upper flanges 110 cannot use the upper flange 22 as a seating surface. Instead, the segmented upper flanges 110 can use the lower internals seating ledge 136. In this way, there is no need to use the sealing means 116 below each segmented upper flange 110. If a unitary upper flange 118 were used, it would seat directly on the lower internals seating ledge 136.

Some modification would also be required for the support structure 134, if used. That is, the support structure 134 would have a shorter span so that minimal clearance would exist between the edges of the support structure 134 and the circumferential area defining the lower internals seating ledge 136 and the bolts 109 probably would be unnecessary because the support structure 134 would be contained in the circumferential area defining the lower internals seating ledge 136.

Regardless of whether the annealing apparatus 28 is assembled inside or outside the reactor vessel 12, once the unit is placed in the reactor vessel 12, the workmen connect the connectors 80, 90 to leads (not shown) extending to the control station so that annealing can be instituted and controlled.

After vessel annealing, the reactor vessel 12 is filled with water and the annealing apparatus is removed. The refueling canal 18 is then flooded to near the operating floor 13 and the temporary shielding is removed.

As would be understood by one having ordinary skill in the art, the annealing apparatus 28 described above can be disassembled and removed from the containment building 10 by merely reversing the steps. Accordingly, if the apparatus 28 was assembled in the stand 132, it should be returned to the stand 132 for disassembly, removal of the individual segments 30 and disassembly and removal of the stand 132. If the apparatus 28 was assembled directly in the reactor vessel 12, each segment 30 is directly removed from the reactor vessel 12 through the containment hatch 34.

The annealing apparatus 28 can be reused by transporting same to other reactors. Further, should the apparatus 28 require repairs, an overhaul or equipment upgrades or improvements, the entire apparatus 28 or a segment 30 thereof can be transported back to the factory where the repair, etc. and testing can be performed.

The annealing apparatus 28 and related methods according to the present invention, including preassembled, self-contained segments 30, besides resolving the significant transportation and introduction obstacles discussed above, also facilitate manufacturing. That is, greater access to the interior of the annealing apparatus 28 enhances the assembly: of the heaters 60, heater elements 62 and thermocouples 70 to the shell 50, as well as power cable 82 and guide tube 92 installation. With ready access to the inside of the shell 50, manufacturing and factory assembly of each segment 30 can be completed in the minimum of time and can be easily inspected and tested, thus providing increased quality and integrity.

The foregoing is considered illustrative only of the principles of the invention. Further, since numerous modifications and changes will readily occur to those skilled in the art, it is not desired to limit the invention to the exact construction and operation shown and described. For example, although the present invention has been described with specific reference to a large commercial reactor in a containment building, one of ordinary skill would recognize that the annealing apparatus of the present invention may also be beneficially used with smaller reactors, if desired. The present invention contemplates such use. Accordingly, all suitable modifications and equivalents may be resorted to that fall within the scope of the invention and the appended claims.

We claim:

1. An apparatus for annealing a reactor vessel the vessel having an open top provided with an upper flange, and the apparatus comprising:

(a) a plurality of arcuate heater segments, each segment having an upper end and including
      (i) a support frame,
      (ii) a heating shell attached to the frame,
      (iii) a plurality of heaters attached to the shell,
      (iv) temperature sensing means attached to the shell adjacent the heaters, and
      (v) a segmented upper flange secured to said support frame at the upper end of said segment and dimensioned to rest upon the reactor vessel upper flange when the segment is disposed in the reactor vessel; and
   (b) means for connecting the plurality of heater segments together in a fixed relation to form the annealing apparatus.

2. The apparatus as recited in claim 1, wherein the connecting means comprises:
   a strap at the periphery of each heater segment.

3. The apparatus as recited in claim 1, wherein the connecting means comprises:
   a bayonet slide at the periphery of each heater segment.

4. The apparatus as recited in claim 1, wherein the plurality of heaters and temperature sensing means are operatively connected to a control means through the segmented flanges.

5. The apparatus as recited in claim 4, further comprising:
   sealing means positioned between each segmented flange and an upper flange of the reactor vessel for providing a water-tight seal between an interior of the reactor vessel and a space above the reactor vessel when the annealing apparatus is positioned within the reactor vessel.

6. The apparatus as set forth in claim 1, wherein said temperature sensing means is a plurality of thermocouples, each capable of being retracted when the annealing apparatus is positioned within and removed from the reactor vessel and of being extended to engage the reactor vessel when the annealing apparatus is positioned in the reactor vessel.

7. A cylindrical apparatus for annealing a reactor vessel, the vessel having an open top provided with an upper flange, and the apparatus comprising:
   (a) a plurality of heater segments, each segment being an equal arcuate portion of a cylinder, each segment having an upper end and including
      (i) a support frame,
      (ii) a heater shell attached to the frame,
      (iii) a segmented flange attached to said support frame at the upper end of the segment, said segmented flange resting upon the reactor vessel upper flange when the segment is disposed in the reactor vessel,
      (iv) a plurality of heaters attached to the heater shell, and
      (v) a plurality of temperature sensing means attached to the heater shell adjacent to the heaters, wherein the plurality of heaters and temperature sensing means are operatively connected to a control means through the segmented flange; and
   (b) means for connecting the plurality of heater segments together in a fixed relation to form the cylindrical annealing apparatus.

8. The apparatus as recited in claim 7, further comprising:
   sealing means positioned between each segmented flange and an upper flange of the reactor vessel for providing a water-tight seal between an interior of the reactor vessel and a space above the reactor vessel when the annealing apparatus is positioned within the reactor vessel.

9. The apparatus as recited in claim 8, further comprising a utility flange connected to each segmented flange.

10. A method for annealing a nuclear reactor vessel in a containment building, said reactor vessel normally including a core and internals, comprising the steps of:
  (a) pre-fabricating a plurality of heater segments at a location outside the containment building;
  (b) transporting the plurality of heater segments to the containment building;
  (c) removing the core and internals and storing same;
  (d) installing temporary shielding for the stored internals;
  (e) introducing each of the plurality of heater segments through an equipment hatch in the containment building;
  (f) assembling the plurality of heater segments to form an annealing apparatus; and
  (g) annealing the reactor vessel.

11. The method as recited in claim 10, wherein step (f) comprises the substeps of:
  (i) assembling the plurality of heater segments into an annealing apparatus in a stand;
  (ii) lifting the annealing apparatus out of the stand; and
  (iii) inserting the annealing apparatus into the reactor vessel.

12. The method as recited in claim 10, wherein step (f) comprises the substep of:
  (i) assembling the plurality of heater segments directly in the reactor vessel.

13. The method as recited in claim 10, further comprising the steps of:
  (h) disassembling the annealing apparatus and temporary shielding; and
  (i) removing the annealing apparatus and temporary shielding from the containment building via the equipment hatch.

14. The method as recited by claim 13, wherein steps (a)–(i) are repeated at a second nuclear reactor.

* * * * *